(12) United States Patent
Guadagno

(10) Patent No.: US 7,906,183 B2
(45) Date of Patent: Mar. 15, 2011

(54) PROCESS FOR MANUFACTURING A FLEXIBLE SUPPORT FOR AN ELECTROPHORETIC MEDIUM

(75) Inventor: Philip A. Guadagno, Vidor, TX (US)

(73) Assignee: Helena Laboratories Corporation, Beaumont, TX (US)

( * ) Notice: Subject to any disclaimer, the term of this patent is extended or adjusted under 35 U.S.C. 154(b) by 885 days.

(21) Appl. No.: 11/694,438

(22) Filed: Mar. 30, 2007

(65) Prior Publication Data

US 2008/0241417 A1 Oct. 2, 2008

(51) Int. Cl.
*C08J 7/18* (2006.01)
*B05D 3/06* (2006.01)

(52) U.S. Cl. .................. 427/536; 106/205.71; 204/462; 204/610; 427/2.11; 427/8

(58) Field of Classification Search .................. 427/536; 204/470
See application file for complete search history.

(56) References Cited

U.S. PATENT DOCUMENTS

| | | | | | |
|---|---|---|---|---|---|
| 3,887,491 | A | * | 6/1975 | Ramirez et al. | 502/159 |
| 4,275,196 | A | * | 6/1981 | Shainoff | 536/115 |
| 4,415,428 | A | * | 11/1983 | Nochumson et al. | 204/606 |
| 4,591,640 | A | * | 5/1986 | Hjerten | 536/114 |
| 4,668,359 | A | * | 5/1987 | Postle et al. | 204/606 |

* cited by examiner

*Primary Examiner* — Michael Kornakov
*Assistant Examiner* — Alexander Weddle
(74) *Attorney, Agent, or Firm* — Jerold I. Schneider; Novak Druce + Quigg LLP

(57) ABSTRACT

A process for making a support for an electrophoretic medium comprising the steps of: applying an agarose coating to a corona treated polymeric film by transferring a layer of agarose solution onto a surface of the corona treated polymeric film. The pH of the agarose solution can be generally maintained between about 8 and about 11 and the concentration of the agarose solution can be generally maintained between about 0.1 and about 0.4% agarose by weight. The agarose powder used to make the agarose solution can be pre-treated by introducing a fresh reducing atmosphere above the agarose powder and exposing the agarose powder to a reducing atmosphere. The reducing atmosphere treatment may be repeated at least three times.

21 Claims, 2 Drawing Sheets

PROCESS FOR MANUFACTURING A FLEXIBLE SUPPORT FOR AN ELECTROPHORETIC MEDIUM

TECHNICAL FIELD

The present description relates to electrophoresis and in particular to a process for making a flexible support for an electrophoretic medium.

BACKGROUND

Electrophoresis is a technique used to separate charged species on the basis of size, electric charge, and other physical properties. In electrophoresis, the charged species migrate through a conductive electrophoretic medium, which may be (but is not required to be) a gel, under the influence of an electric field. Activated electrodes located at either end of the electrophoretic medium provide the driving force for the migration. The properties of the molecules, including their charge and mass, determine how rapidly the electric field causes them to migrate through the electrophoretic medium.

Many important biological molecules, such as amino acids, peptides, proteins, nucleotides, and nucleic acids, posses ionizable groups. Because of these ionizable groups, at any given pH, many important biological molecules exist in solution as electrically charged species. The electrically charged species enable doctors and scientists to separate nucleic acids and proteins using electrophoresis.

Separation of molecules, biological or otherwise, using electrophoresis depends on various forces, including charge and mass. When a biological sample, such as a protein or DNA, is mixed in a buffer solution and applied to an electrophoretic medium these two forces act together. Separation using electrophoresis is possible because the rate of molecular migration through the electric field depends on the strength of the field, the size and shape of the molecules, and the ionic strength and temperature of the buffer through which the molecules are moving. During electrophoresis, the applied electrical field causes the molecules to move through the pores of the electrophoretic medium based on the molecular charge. The electrical potential at one electrode repels the molecules while the potential at the other electrode simultaneously attracts the molecules. The frictional force of the electrophoretic medium also aids in separating the molecules by size. After the applied electrical field has been removed, the molecules may be stained. After staining, the separated macromolecules can be seen in a series of bands spread from one end of the electrophoretic medium to the other. If these bands are sufficiently distinct, the molecules in these zones can be examined and studied separately by fixing macromolecules and washing the electrophoretic medium to remove the buffer solution.

In order to prevent the electrophoretic medium from fracturing during the handling required for procedures commonly associated with electrophoresis it is useful to adhere the electrophoretic medium to a suitable support. A desirable electrophoretic support designed to prevent fracturing of the medium should be adherent to the medium, dimensionally stable and thermally stable.

U.S. Pat. No. 4,415,428, issued to Nochumson et al., discloses an electrophoretic support comprising a base plate having on at least one side thereof, a layer of an adherent resin. The adherent resin is derivatized to include ethylenically unsaturated groups capable of undergoing copolymerization with acrylamide. Supports coated with these adherent resins are particularly useful for bonding to a polyacrylamide gel cast on the support.

In U.S. Pat. No. 4,415,428, the adherent resins are derivatized in reactions with acylating or allylating reagents that include 2 to 12 carbons and at least one ethylenically unsaturated member. The aldehyde end groups of polysaccharide resins must be blocked to prevent the polysaccharides resins from being discolored as a result of acylation or alkylation. Following derivatization, the derivatized adherent resin must be purified and any solvents removed. However, there is still the risk that the residue left by the derivatization process may contaminate the electrophoretic buffer solution and the derivatization process may cause the resin to become discolored.

It is also known that a small percentage, typically 10% or less, of unmodified agarose lots purchased commercially are useful as adherent resins for electrophoretic supports under limited conditions. The small percentage of unmodified agarose lots useful as adherent resins are typically low electroendosmosis (LE) agarose, although a smaller percentage of middle electroendosmosis (ME) agarose lots are useful as adherent resins. Thus, commercially purchased agarose lots are commonly sampled to determine whether they posses the necessary properties to bind a polymeric support to an electrophoretic medium.

When unmodified agarose lots are used as adherent resins, an electrophoretic support is generally formed by applying an agarose solution to a corona "treated" polymeric support. Once the agarose solution dries, an electrophoretic medium may be cast directly upon the polymeric support. Approximately 10% of the unmodified agarose lots purchased commercially provide sufficient bonding to act as an adherent resin. Prior to the technique described herein, there was no way of determining, except through trial and error, whether a specific agarose lot possessed the necessary properties, except to coat the agarose onto a polymeric support, cast an electrophoretic medium on the agarose coating and evaluate the bonding. Similarly, prior to the claimed there is no known method of making a larger percentage of commercially purchased agarose lots useful as adherent resins for electrophoretic supports.

Thus, a need exists for a method of making a larger number of agarose lots useful as the adherent resin for an electrophoretic support. A need also exists for a method of malting an electrophoretic support with an adherent coating that creates a reduced risk of contamination or discoloration.

SUMMARY

A process for making a support for an electrophoretic medium. The method can include the steps of applying an agarose coating to a corona treated polymeric film. The agarose coating can be applied by transferring a layer of agarose solution onto a surface of the corona treated polymeric film. The pH of the agarose solution can be between about 8 and about 11, and the agarose solution can comprise between about 0.1 and about 0.4% agarose by weight. The polymeric film may be corona treated prior to applying the agarose coating to the polymeric film.

The process for making an electrophoretic support medium (note, elect medium is the ionic gel) can include evaporating a solvent from the agarose solution transferred onto the polymeric film. The thickness of the dried agarose coating can be between a monolayer and about 0.025 mm.

The process for making an electrophoretic support medium can also include the step of exposing agarose powder to a reducing atmosphere, and creating the agarose solution by dissolving the treated agarose powder in a solvent. The exposure of the agarose to the reducing atmosphere can continue for at least 12 hours.

The exposing step can include (i) introducing a reducing atmosphere above the agarose powder, (ii) exposing the agarose powder to a reducing atmosphere for at least 12 hours, and (iii) repeating the introducing and exposing steps at least once. The introducing and exposing steps can be repeated at least three times. The reducing atmosphere can be carbon monoxide (CO) gas.

The agarose solution can be an aqueous solution. The agarose solution can be formed using LE agarose, ME agarose, or a combination thereof. The agarose solution can be made from LE agarose. The pH of the agarose solution can be between about 9 and about 11. The agarose solution can comprise between about 0.2 and about 0.4% agarose by weight. The agarose solution can comprise between about 0.2 and about 0.4% agarose by weight and comprise LE agarose.

The polymeric film can be a polyester. The polyester can be a polyester selected from polyethylene terephthalate, polybutylene terephthalate, polytrimethylene terephthalate, polycyclohexylenedimethylene terephthalate, polyurethanes, co-polymers thereof and combinations thereof. The polyester can be a biaxially-oriented polyethylene terephthalate.

Various objects, advantages and features will become more apparent from the following detailed description of the presently preferred embodiments, including the appended claims.

BRIEF DESCRIPTION OF THE DRAWINGS

The accompanying drawings, which are incorporated in and form a part of the specification, illustrate embodiments and, together with the description, disclose the principles of the present description.

DETAILED DESCRIPTION

Figure 1:
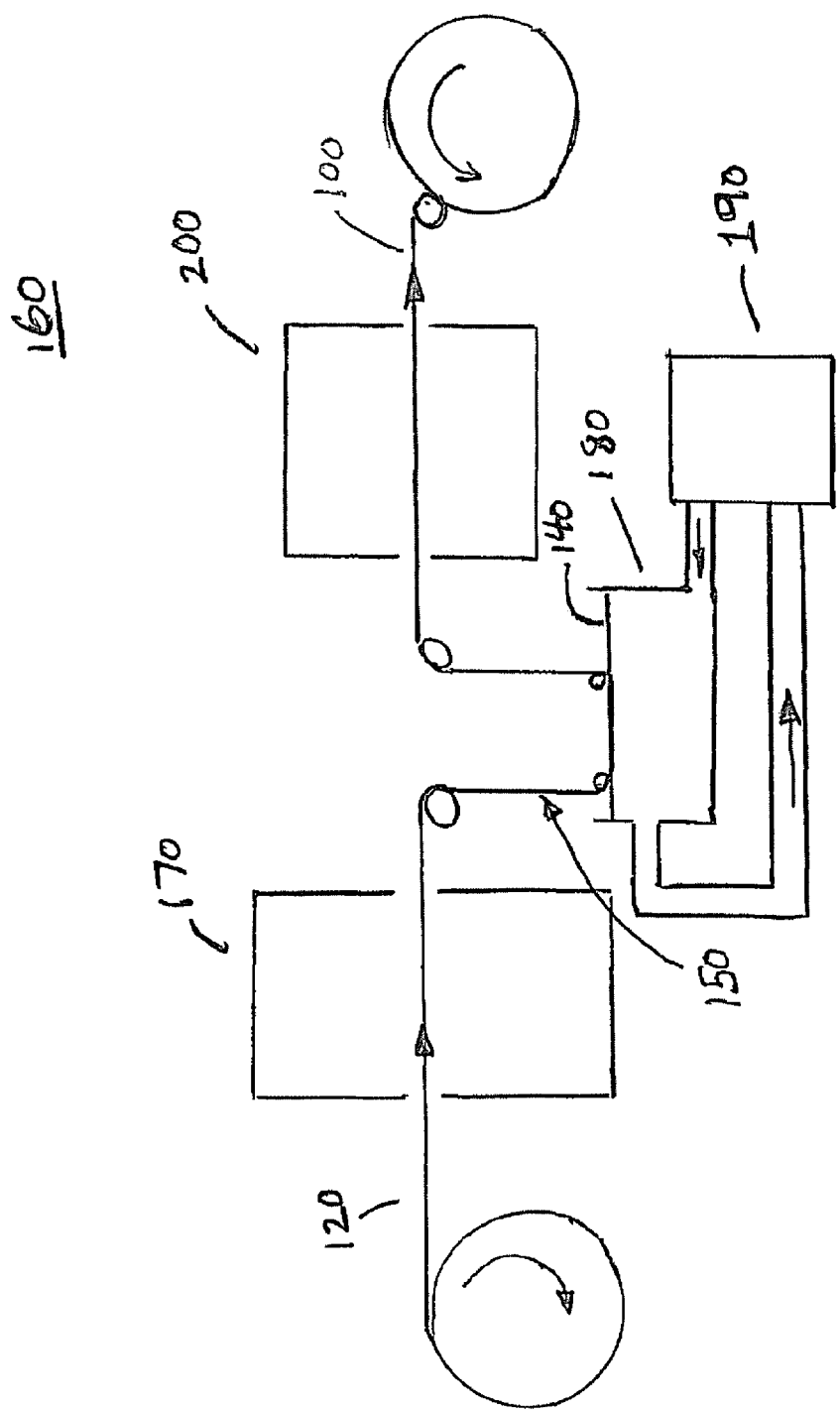
FIG. 1 is a diagrammatic side view of equipment and a process that may be useful in malting the flexible support, including a plasma treatment unit, a fluid application unit, a pH monitoring unit, and a drying unit.
Figure 3:
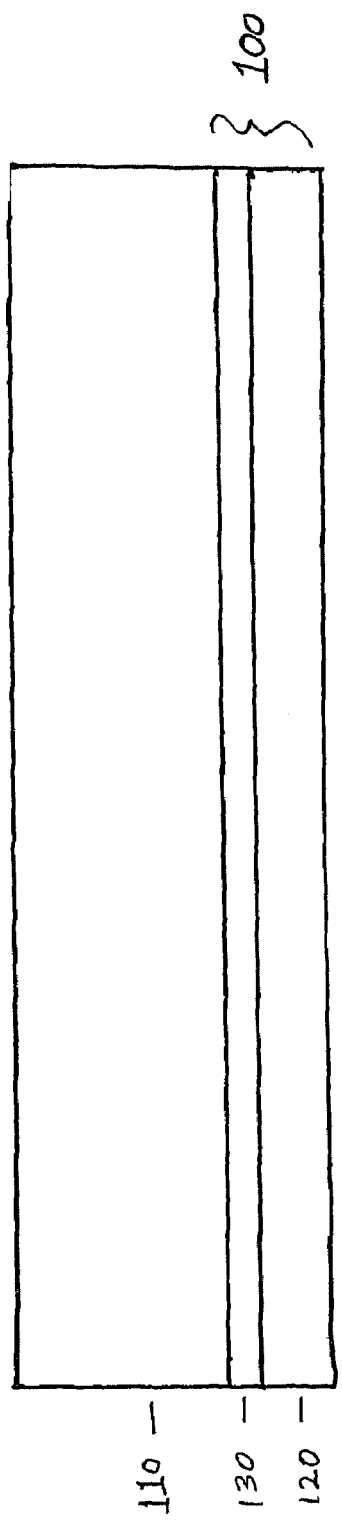
FIG. 3 is a side view of an electrophoretic medium attached to the support of FIG. 2.
Figure 2:
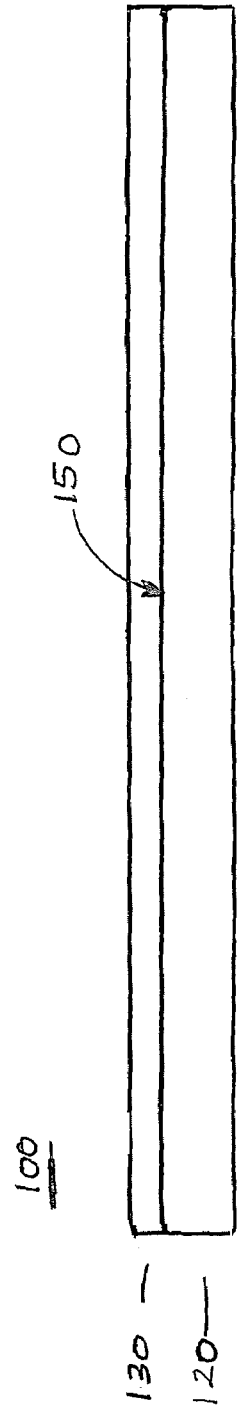
FIG. 2 is a side view of a support for an electrophoretic medium.

Referring to FIGS. 1-3, the present method can be used to make a support 100 for an electrophoretic medium 110. The support 100 can consist of a polymeric film 120 and a treated agarose coating 130. The agarose coating 130 can be used to adhere an electrophoretic medium 110, such as an agarose gel, to the support 100.

The support 100 can be produced by corona treating a polymeric film 120 and applying an agarose coating 130 to the corona treated polymeric film 120 by transferring a layer of agarose solution 140 onto the corona treated surface 150 of the polymeric film 120. The pH of the agarose solution 140 can be between about 8 and about 11 and the agarose solution 140 can contain between about 0.1 and about 0.4% agarose by weight. In the present description, the term "maintaining" when referring to pH is intended to encompass situations such as, but not limited to, short term excursions in the pH, because pH control is not instantaneous, and because the solution is not perfectly homogenous. Similarly, the term "maintaining" when referring to concentration of the agarose solution is intended to encompass situations such as but not limited to evaporation which increases the concentration and the fact that the concentration of the solution is not necessarily uniform especially since the solution is not perfectly homogenous.

The process can also include exposing agarose powder to a reducing atmosphere and creating the agarose solution 140 by dissolving the treated agarose powder in a solvent. The exposing step can include contacting the agarose powder with a reducing atmosphere for at least 12 hours.

Alternatively the exposing step can comprise introducing a fresh reducing atmosphere above the agarose powder, exposing the agarose powder to a reducing atmosphere, and repeating the introducing and contacting steps at least once, preferably at least three times and more preferably at least five times. In the exposing step, the agarose powder may be exposed to a reducing atmosphere for at least 12, hours 8 hours or 24 hours or any amount therebetween. The reducing atmosphere may be any reducing atmosphere including, but not limited to, carbon monoxide.

Although not necessary, the exposing step may take place at ambient temperature. As used herein, ambient temperature includes any temperature between about 15 degrees Celsius and 25 degrees Celsius or any temperature therebetween. Thus the term "generally maintaining" when referring to temperature, is intended to encompass situations such as, but not limited to, short term excursions because temperature adjustment is not instantaneous and because temperature may not be uniform.

The exposing step can be conducted in any volume with a controlled atmosphere including, but not limited to, a sealed container, a container with a recirculation pump, or a hood with controlled input gases. The atmosphere present in the exposing step can consist essentially of a reducing atmosphere. As used herein, an atmosphere consists essentially of a reducing atmosphere if, of all the gases present, at least 60 vol-% are capable of reducing agarose at ambient temperature. In other embodiments, at least 75 vol-%, or at least 90 vol-%, or at least 95 vol-% or even at least 97.5 vol-% of the gases present are capable of reducing agarose at ambient temperature. In some embodiments, 100 vol-% of the atmosphere may consist of gases capable of reducing agarose at ambient temperature. The above ranges are intended to include all percentages therebetween.

Those of ordinary skill in the art will recognize that there are many commercially available grades of agarose. Agarose grades are generally classified based on the purity of the agarose, as reflected in the electroendosmosis (EEO) value of the agarose. Among the available agarose grades are iso-gel agarose, low EEO (LE) agarose, medium EEO (ME) agarose, high EEO (HE) agarose, and highest EEO (HEEO) agarose. As used herein, iso-gel agarose has an essentially undetectable EEO, LE agarose has an EEO between about 0.05 and about 0.13, ME agarose has an EEO between about 0.16 and about 0.19, HE agarose has an EEO between about 0.23 and about 0.26, and HEEO has an EEO of about 0.30 or greater.

The agarose used in the agarose solution 140 can be LE agarose, ME agarose, or a combination of both. In one embodiment, the agarose in the agarose solution 140 can be exclusively LE agarose, ME agarose, or a combination of both. In another embodiment, the agarose in the agarose solution 140 can be exclusively LE agarose. The agarose solution 140 can be an aqueous solution.

The polymeric film 120 may formed from any number of non-conductive polymer compositions which are dimensionally and thermally stable. In addition, the agarose or treated agarose in the agarose solution 140 can adhere to the corona treated surface 150 of the polymeric film 120. Polymeric films 120 which can be useful in the present method include polystyrene, polypropylene, styrene-acrylonitrile copolymers, polycarbonate, cellulose acetate propionate, cellulose acetate butyrate, nitrile-acrylonitrile-styrene copolymers, polyacrylate, polyesters, polyterephthalate, polymethacrylate, acrylonitrile-butadiene-styrene copolymers, copolymers thereof and mixtures thereof.

In one embodiment, the polymeric film 120 can be a polyester. Polyesters useful in the present method include, but are not limited to, polyethylene terephthalate, polybutylene terephthalate, polytrimethylene terephthalate, polycyclohexylenedimethylene terephthalate, polyurethanes, co-polymers thereof and mixtures thereof. In a preferred embodiment, the polyester can be a biaxially-oriented polyethylene terephthalate, such as that sold by E.I. du Pont de Nemours and Company under the MYLAR trademark.

The present method of making an electrophoretic support 100 can be performed using a manufacturing process 160, such as that shown in FIG. 1. A polymeric film 120 passes through a corona treatment unit 170. The corona treatment unit 170 imparts a charge to the polymeric film 120 making the film 120 temporarily more hydrophilic. As will be recognized by one of ordinary skill in the art, once corona treated, properly stored polymeric films may retain an elevated hydrophilic level for several weeks or even months.

Next, an agarose coating 130 is applied to the polymeric film 120. As shown in FIG. 1, one method of applying an agarose coating is to flood the treated surface 150 of the polymeric film 120 with the agarose solution 140. This may include contacting the polymeric film 120 with an agarose solution 140 above a recirculating reservoir 180.

The flood treatment serves two primary purposes. First, it aids with removal of excess charged biproducts generated by the reaction between the agarose and the treated surface 150 of the polymeric film 120. Second, flood treatment assists with maintenance of the pH level of the agarose solution 140. In order to avoid cosmetic problems, application of the agarose solution 140 should generally be performed in a manner that avoids coating the untreated surface of the polymeric film 120.

Although not shown, the present method encompasses other techniques for applying the agarose solution 140 to the polymeric film 120 including, but not limited to, gravure rolls and spray application. If a reservoir 180 is used, the reservoir 180 can be connected to a recirculation pump 190 in order to keep the agarose solution 16 well mixed, maintain the pH of the agarose solution 140 in the desired range, and maintain the temperature of the agarose solution 140 in the desired range. The desired temperature range for the agarose solution 140 is generally between 40 and 80 degrees Celsius, preferably between 50 and 75 degrees Celsius, more preferably between 60 and 70 degrees Celsius or even between 55 and 65 degrees Celsius.

Finally, a dryer 200 may be used to eliminate any residual solvent from the agarose solution 140. The temperature of the dryer 200 should be selected to efficiently evaporate residual solvent from the agarose coating 130 without sacrificing the mechanical properties of the polymeric film 120. In general, this means the temperature of the dryer 200 can be maintained below the glass transition point of the polymeric film 120.

The agarose solution 140 of the present method can have a pH between 8 and 11. It was surprising to discover that when the pH of the agarose solution 140 is below this range the bonding between the agarose coating 130 and the electrophoretic medium 110 can be significantly compromised over time. Although not wishing to be bound by any one theory, it is believed that when the electrophoretic medium 110 or the agarose coating 130 are exposed to pH levels below this range, particularly in the acidic range, the covalent bonds between the agarose coating 130 and the electrophoretic medium 110 become hydrolyzed. In some embodiments, the agarose solution 140 can be maintained in a pH range between about 9 and about 11, preferably between about 9.5 and about 10.5, and more preferably between about 9.8 and about 10.

If the present method is performed using an embodiment where the corona treated polymeric film 120 is contacted with a reservoir 180 of the agarose solution 140, the pH of the agarose solution 140 decreases considerably over time. As the agarose solution 140 reacts with the treated surface 150 of the polymeric film 120, a positive charge is released into the solution 140. The charge transfer to the agarose solution 140 generates hydronium ions, thereby reducing the pH of the agarose solution 140. Thus, in some embodiments it may be useful to include a recirculation pump 190, or another device, that can monitor pH and add a basic solution, for example a 5 M sodium hydroxide solution, as necessary to maintain the pH within the target pH range. The solvent in 5 M NaOH can be used to control/maintain adverse effects of evaporation.

The agarose coating 130 serves as a bridge between a corona treated surface 150 of the polymeric film 120 and an electrophoretic medium 110 cast upon the previously deposited agarose coating 130. The bonds between the corona treated surface 150 of the polymeric film 120 and the agarose molecules of the agarose coating 130 appear to be significantly stronger than the agarose-agarose bonds within the agarose coating 130. Since the objective is to create the best possible bond between the electrophoretic medium 110 and the polymeric film 120, it is desirable to reduce the number of agarose-to-agarose bonds in the bridge between the polymeric film 120 and the electrophoretic medium 110. Thus, it is desirable to deposit a thin agarose coating 130 on the polymeric film 120.

In one embodiment, the thickness of the agarose coating 130 after drying is between a monolayer and about 0.025 mm, preferably between a monolayer and 0.0025 mm, and more preferably between a monolayer and 0.00025 mm. The thickness measurements described herein are generally measured using a high precision thickness gauge. Such a gauge may be a non-contact gauge or a contact gauge exerting 0.5 psi on the sample.

The agarose solution 140 can contain between about 0.1% and about 0.4% agarose by weight including any range therebetween. The agarose in the agarose solution 140 can be LE agarose or ME agarose alone, or a combination of both. Similarly, the agarose solution 140 can contain between about 0.2 and about 0.4% agarose by weight, where the agarose in the agarose solution 140 is solely LE agarose. The agarose in the agarose solution 140 may, consist of LE agarose, ME agarose or a combination thereof. These low percentages of agarose are useful for applying a thin agarose coating using the present method.

While the following examples are not intended to be limiting in scope, they will assist those skilled in the art appreciate the present discovery.

EXAMPLE

LE Agarose & ME Agarose

A commercially available 100 g sample of an LE agarose was obtained. Two 10 g aliquots, labeled CO-LE and LE, were removed from the 100 g sample. Each aliquot was placed in and sealed in a separate container, having a volume more than four times the volume of the agarose aliquot. Aliquot CO-LE was subjected to a carbon monoxide treatment, whereas aliquot LE was not.

For the carbon monoxide treatment, the CO-LE aliquot container was placed in a CO exposure hood. A flexible hose was connected to a CO supply providing 15 ml/min of gaseous CO at ambient conditions. The CO-LE aliquot container was opened and, for ten minutes, the agarose powder was thoroughly, but gently, mixed using the flexible hose supplying the gaseous CO. After the ten minute mixing step was completed the flexible hose was removed from the CO-LE aliquot container. Immediately after the flexible hose was removed, the CO-LE aliquot container was resealed. The sealed CO-LE aliquot container was placed in a laboratory "V-Blender" and rotated for approximately 24 hours at a temperature that did not exceed 30 degrees Celsius. "V-Blenders" useful for performing this sort of mixing are available commercially, and include model LB-8409 twin shell dry blenders sold by the Patterson-Kelly Company.

Four different solutions, each with a different agarose concentration, were made from each of the two aliquots, CO-LE and LE. The concentrations were 0.1%, 0.2%, 0.3% and 0.4%. The solutions were prepared by dissolving the necessary amount of the agarose in deionized water that had been heated to between 95 and 96 degrees Celsius. Once the agarose was dissolved in the deionized water, the agarose solution was maintained at a temperature between 60 and 70 degrees Celsius.

For each of the concentrations (0.1%, 0.2%, 0.3% and 0.4% agarose), solutions were formulated having pH levels of 7, 8, 9, & 10, respectively. This resulted in a total of sixteen solutions for each of the two aliquots.

A 55.88 mm wide MYLAR web was corona treated and then cut into 19.84×15.24 mm samples. Ten corona treated MYLAR samples were dipped into each of the sixteen solutions for each of the two aliquots. The samples were then allowed to dry to create electrophoretic supports. This same procedure was carried out with a commercially available 100 g sample of ME agarose and these are identified in the table below as CO-ME and ME respectively.

An electrophoretic medium, in this case agarose, was cast upon each of the samples and allowed to set for 72 hours. A push test was then conducted to determine adherence of the electrophoretic medium to the MYLAR film. The push test consisted of pushing a surface through the electrophoretic medium and assessing the degree of adhesion qualitatively as a function of the resistance of separating the electrophoretic medium from the support between the electrophoretic medium and the MYLAR support. Results were recorded as excellent, good, fair, poor, or failed. This test was repeated for both LE agarose and ME agarose. The results are summarized below in Table 1:

|      |         | CO-LE     | LE        | CO-ME     | ME        |
|------|---------|-----------|-----------|-----------|-----------|
| 0.1% | pH = 7  | Poor      | Failed    | Poor      | Poor      |
|      | pH = 8  | Fair      | Poor      | Excellent | Excellent |
|      | pH = 9  | Good      | Good      | Excellent | Excellent |
|      | pH = 10 | Excellent | Excellent | Excellent | Excellent |
| 0.2% | pH = 7  | Poor      | Failed    | Failed    | Failed    |
|      | pH = 8  | Excellent | Excellent | Good      | Failed    |
|      | pH = 9  | Excellent | Excellent | Excellent | Excellent |
|      | pH = 10 | Excellent | Excellent | Excellent | Excellent |
| 0.3% | pH = 7  | Good      | Failed    | Failed    | Failed    |
|      | pH = 8  | Excellent | Excellent | Good      | Good      |
|      | pH = 9  | Excellent | Good      | Excellent | Poor      |
|      | pH = 10 | Excellent | Excellent | Excellent | Excellent |

-continued

|      |         | CO-LE     | LE        | CO-ME     | ME        |
|------|---------|-----------|-----------|-----------|-----------|
| 0.4% | pH = 7  | Poor      | Failed    | Failed    | Failed    |
|      | pH = 8  | Fair      | Fair      | Failed    | Failed    |
|      | pH = 9  | Good      | Good      | Good      | Good      |
|      | pH = 10 | Excellent | Excellent | Excellent | Excellent |

Surprisingly, the agarose aliquots treated with CO gas generally produced electrophoretic supports that exhibited better adhesion than the untreated agarose aliquots. Equally surprising, using the disclosed methods, more than 50% of the commercially available LE and ME agarose lots tested proved to be satisfactory adherent resins. This compares to 10% or fewer using prior art techniques.

It is believed that the hydrophilic nature of the agarose, augmented by coordinated water (typically <10% in commercially available agarose powders) allows mild reduction of agarose exposed to a reducing atmosphere. Bonding between the polymeric film 120 and the treated agarose requires a balance between the corona treatment of the polymeric film 120 and the steric characteristics of the agarose moiety. These characteristics may be manipulated by ReDox agents, pH and concentration of the agarose solution, the molecular weight of the agarose, and the EEO of the agarose. The EEO of the agarose may be manipulated by any number of means including, but not limited to, sulfonation and methoxy content.

The present method provides a new and improved approach for making electrophoretic medium supports. The foregoing is a complete description of the preferred or optimum formula, as well as ranges thereof, for an improved support for an electrophoretic medium and method making a support for an electrophoretic medium. The method should not be limited by the specific data presented because numerous modifications will be apparent to those of ordinary skill in the art. The invention, therefore, should be limited only by the following claims.

I claim:

1. A process for making a support for an electrophoretic medium comprising the steps of:
    applying a coating consisting essentially of agarose to a corona treated surface of a polymeric film by transferring a layer of a solution of agarose onto the corona treated surface, while
    maintaining the pH of the agarose solution which is being transferred between about 8 and about 11, and
    maintaining the concentration of the agarose solution which is being transferred between about 0.1 and about 0.4% agarose by weight.

2. The process of claim 1, further comprising:
    exposing an agarose powder to a reducing atmosphere, and
    creating the agarose solution by dissolving the treated agarose powder in a solvent.

3. The process of claim 2, wherein the exposing step further comprises exposing the agarose powder to a reducing atmosphere for at least 12 hours.

4. The process of claim 2, wherein the exposing step comprises,
    (i) introducing a reducing atmosphere above the agarose powder,
    (ii) exposing the agarose powder to said reducing atmosphere, and
    (iii) repeating steps (i) and (ii) at least once.

5. The process of claim 4, wherein steps (i) and (ii) are repeated at least three times.

6. A process for making a support for an electrophoretic medium comprising the steps of:
applying a coating consisting essentially of agarose to a corona treated surface of a polyester film by transferring a layer of a solution of agarose onto the corona treated polyester surface, while
maintaining the pH of the agarose solution which is being transferred between about 8 and about 11, and
maintaining the concentration of the agarose solution which is being transferred between about 0.1 and about 0.4% agarose by weight.

7. The process of claim 6, wherein the polymeric film is a polyester selected from the group comprising polyethylene terephthalate, polybutylene terephthalate, polytrimethylene terephthalate, polycyclohexylenedimethylene terephthalate, polyurethanes, co-polymers thereof and combinations thereof.

8. The process of claim 7, wherein the polyester is a biaxially-oriented polyethylene terephthalate.

9. The process of claim 6, wherein the agarose solution is an aqueous solution.

10. The process of claim 6, further comprising evaporating a solvent from the agarose solution transferred to the polyester film.

11. The process of claim 1, wherein a thickness of the agarose coating after drying is between a monolayer and about 0.00025 mm.

12. The process of claim 6, further comprising:
exposing agarose powder to a CO atmosphere, and
creating the agarose solution by dissolving the CO-treated agarose powder in a solvent.

13. The process of claim 12, wherein the exposing step further comprises contacting the agarose powder with gaseous CO for at least 12 hours.

14. The process of claim 12, wherein the exposing step comprises,
(i) introducing a CO atmosphere above the agarose powder,
(ii) exposing the agarose powder to gaseous CO, and
(iii) repeating steps (i) and (ii) at least once.

15. The process of claim 14, wherein steps (i) and (ii) are repeated at least three times.

16. The process of claim 6, wherein the thickness of the agarose coating after drying is between a monolayer and about 0.00025 mm.

17. The process of claim 6, wherein an agarose in the agarose solution comprises LE agarose, ME agarose, or a combination thereof.

18. The process of claim 6, wherein an agarose in the agarose solution comprises LE agarose.

19. The process of claim 6, wherein the pH of the agarose solution is maintained between about 9 and about 11.

20. The process of claim 6, wherein the concentration of the agarose solution is maintained between about 0.2 and about 0.4% agarose by weight.

21. The process of claim 6, wherein the concentration of the agarose solution is maintained between about 0.2 and about 0.4% agarose by weight and said agarose solution comprises LE agarose.

* * * * *